United States Patent
Ciotola

(10) Patent No.: US 12,031,595 B1
(45) Date of Patent: Jul. 9, 2024

(54) DUAL LAYERED BUSHING

(71) Applicant: Alfredo A. Ciotola, Warren, NJ (US)

(72) Inventor: Alfredo A. Ciotola, Warren, NJ (US)

( * ) Notice: Subject to any disclaimer, the term of this patent is extended or adjusted under 35 U.S.C. 154(b) by 0 days.

(21) Appl. No.: 18/223,260

(22) Filed: Jul. 18, 2023

(51) Int. Cl.
*F16D 3/76* (2006.01)
*F16D 3/68* (2006.01)

(52) U.S. Cl.
CPC .......... *F16D 3/76* (2013.01); *F16D 3/68* (2013.01); *Y10T 403/458* (2015.01)

(58) Field of Classification Search
CPC ........... F16D 3/76; F16D 3/68; Y10T 403/458
USPC ................ 464/70, 90, 71; 403/228; 16/2.1
See application file for complete search history.

(56) References Cited

U.S. PATENT DOCUMENTS

| | | |
|---|---|---|
| 268,807 A | 12/1882 | Landis |
| 1,188,113 A | 6/1916 | Thomas |
| 1,343,413 A | 6/1920 | Smith et al. |
| 1,365,957 A | 1/1921 | Smith |
| 1,402,688 A | 1/1922 | Travis |
| 1,482,097 A | 1/1924 | Smith |
| 1,814,836 A | 7/1931 | Lederman |
| 1,862,355 A | 6/1932 | Anderson |
| 2,181,888 A | 12/1939 | Gustin |
| 2,453,012 A | 11/1948 | Hickman |
| 2,930,211 A | 3/1960 | Guy |
| 3,107,953 A * | 10/1963 | Palm .................. F16C 33/22 |
| 3,304,743 A | 2/1967 | Paulsen |
| 3,422,637 A | 1/1969 | Kelley |
| 3,724,239 A | 4/1973 | Calistrat |
| 4,591,350 A | 5/1986 | Obermeier |
| 5,676,613 A | 10/1997 | Valcourt et al. |
| 6,325,722 B1 | 12/2001 | Ciotola |
| 6,379,048 B1 | 4/2002 | Brissette |
| 9,279,450 B2 | 3/2016 | Zaike et al. |
| 10,865,835 B1 | 12/2020 | Ciotola |
| 11,293,488 B1 | 4/2022 | Ciotola |

(Continued)

FOREIGN PATENT DOCUMENTS

| | | | |
|---|---|---|---|
| AT | 188562 B * | 1/1957 | ...................... 464/72 |
| CN | 20333201 U | 7/2013 | |

(Continued)

OTHER PUBLICATIONS

Columbia Industrial Products; CIP Composites Material Spec Sheet CIP353/CIP353A/CIP353B. No. 50353 REV.03.

*Primary Examiner* — Greg Binda
(74) *Attorney, Agent, or Firm* — Roberts & Roberts, LLP

(57) ABSTRACT

A compressively resilient, dual layered bushing useful for aligning shafts and couplings and adjusting shaft misalignment. It has a cylindrical sleeve with an outer wall, and a hollow core defining an inner wall extending from a top to a bottom of the cylindrical sleeve. The cylindrical sleeve comprises a first compressively resilient material and has separated, parallel grooves through the outer wall around its circumference. A cylindrical outer tube is attached around the outer wall of the cylindrical sleeve from the top to the bottom. The outer tube has a smooth outer wall and an inner wall having separated parallel projections extending outwardly around the inner wall of the outer tube. The projections are attached to and mate with the grooves through the outer wall around the cylindrical sleeve. The cylindrical outer tube and the projections comprise a second different compressively resilient material.

17 Claims, 5 Drawing Sheets

(56) References Cited

U.S. PATENT DOCUMENTS 11,299,003 B2 * 4/2022 Kim ................. B60G 7/001
2005/0070365 A1 3/2005 Riefe et al.

FOREIGN PATENT DOCUMENTS

| CN | 111271375 A | | 6/2020 | |
|----|-------------|---|--------|---------|
| GB | 462542 A | * | 3/1937 | ......... 403/228 |
| GB | 1402858 | | 8/1975 | |

* cited by examiner

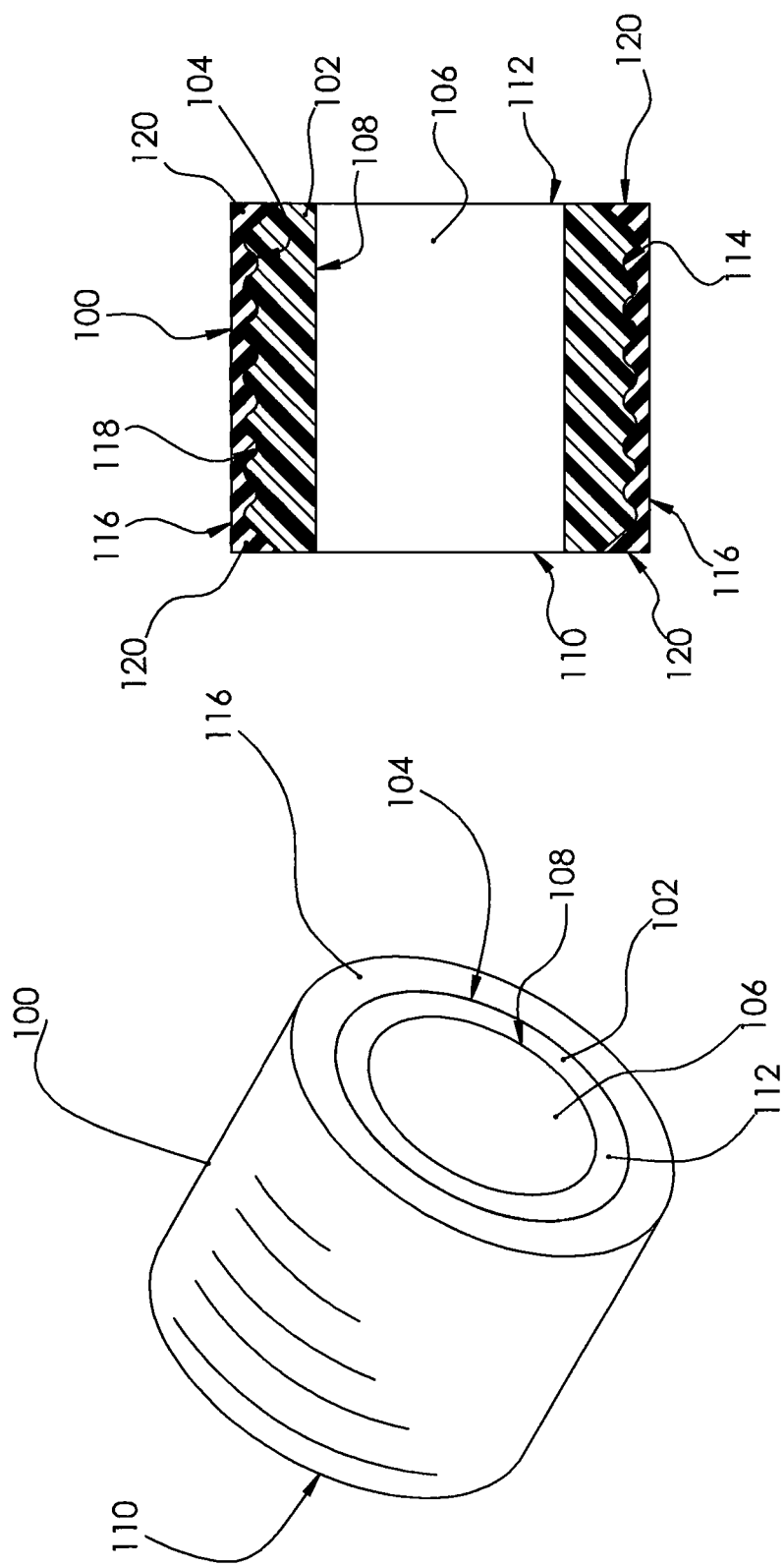

DUAL LAYERED BUSHING

BACKGROUND OF THE INVENTION

Field of the Invention

The present invention relates to a compressively resilient, dual layered bushing which finds use aligning shafts and couplings. More particularly, the invention relates to a bushing for joining rotatable shafts which adjust shaft misalignment. The bushings find use as component parts of shaft coupling alignment devices such as those shown in U.S. Pat. Nos. 11,293,488, 10,865,835 and 6,325,722 which are incorporated herein by reference.

Description of the Related Art

There is great commercial interest in rotatable shafts which are typically used in motor powered mechanical devices such as pumps and the like. These devices cooperate with a motor via a rotatable shaft which, when rotated along a fixed axis, rotates other machine parts. Because these shafts can only reach limited lengths, they are often connected to one another to form a longer, continuous rotatable shaft. Attempts have been made in the art to compensate for misalignment in rotatable shafts, however rotational vibrations in such shafts and couplings eventually result in an angular distortion and misalignment between the shafts. Shaft axes inevitably exert a lateral force which causes bearings to wear out. This leads to improper shaft rotation, unscheduled outages and costly repairs.

Various attempts have been made to compensate for misalignment between rotatable shafts. Chinese patent CN 111271375A discloses a plain bearing comprising at least three elastic sheets and grooves which are arranged on the outer side wall of an outer ring main body at intervals. The outer contour of each elastic sheet is Y-shaped on the section vertical to the central shaft of the outer ring main body. Great Britain patent GB 1402858A discloses an aerodynamic journal bearing comprising a plurality of arcuate bearing pads mounted in a casing by resilient material which has cavities to facilitate the tilting of each pad about a position offset from the center of its length. The surface of each pad is remote from its bearing surface provided with a pair of recesses which define a tongue about which the pad tends to tilt. Apertures may be provided in the casing into which the resilient material, such as silicone rubber, extends to locate the material. U.S. patent application 2005/0070365 discloses a linear bushing for a telescoping steering column. It comprises a plurality of convolutions disposed axially in side-by-side relationship as viewed in cross-section and extending between the ends of the bushing to provide outer load bearing surfaces to engage the inner surface of the upper jacket. It provides inner load bearing surfaces to engage the outer surface of the lower jacket and to provide radial walls for flexing to maintain the bearing surfaces in engagement with the jackets to allow the bushing to radially expand and contract. Chinese patent CN 203332201U discloses an elastic rack bush which comprises a bush circular ring body. Axial teeth are arranged on the outer wall of the bush circular ring body, two parallel annular grooves are formed in the axial teeth, and annular springs are arranged in the annular grooves. The elastic rack bush can eliminate abnormal sound generated in a gap of a rack and the bush body, and prolong the service life of products. U.S. Pat. No. 9,279,450 discloses a bush bearing for a rack shaft comprising a plurality of axial slits and radial grooves with endless annular-shaped elastic members. U.S. Pat. No. 6,379,048 discloses a resilient, self-aligning bearing cushion having flexing recesses, providing central support for a vehicle driveline.

It has been found that existing bushings have operating limitations which lead to failure conditions. These include torque rating, that is a rubber layer around the bushing gets squashed and causes the bushing and the coupling to fail. Also there is a great degree of misalignment, that is, part of the bushing develops excessive wear on the inside diameter causes the bushing and the coupling to fail. Higher operating temperature develops and a rubber layer practically "cooks" and delaminates off of an insert layer. It would be advantageous to provide a compressively resilient bushing, which for this invention is defined as a bushing having the ability to recover its size and shape after elastic deformation caused by compressive stress.

SUMMARY OF THE INVENTION

The invention provides a bushing which comprises:

A cylindrical sleeve, said cylindrical sleeve having an outer wall, and a hollow core through said cylindrical sleeve defining an inner wall of the cylindrical sleeve. The hollow core extends longitudinally from a top of the cylindrical sleeve to a bottom of the cylindrical sleeve. The cylindrical sleeve comprises a first compressively resilient material.

A plurality of separated, parallel grooves through the outer wall extend around a circumference of the cylindrical sleeve.

A cylindrical outer tube is attached around the circumference of the outer wall of the cylindrical sleeve extending from the top of the cylindrical sleeve to the bottom of the cylindrical sleeve. The outer tube has a smooth outer wall and an inner wall having a plurality of separated parallel projections extending outwardly from the inner wall of the outer tube and extending around a circumference of the inner wall of the outer tube.

The projections from the inner wall of the outer tube are attached to and mate with the plurality of grooves through the outer wall around the circumference of the cylindrical sleeve.

The cylindrical outer tube and the projections comprise a second compressively resilient material different from the first compressively resilient material.

BRIEF DESCRIPTION OF THE DRAWINGS

FIG. 1 illustrates a perspective view of a compressively resilient, dual layered bushing according to the invention.

FIG. 2 shows a cross section view of dual layered bushing having a cylindrical sleeve with arcuate grooves around its outer circumference and a cylindrical outer tube.

DESCRIPTION OF THE INVENTION

Figure 3:
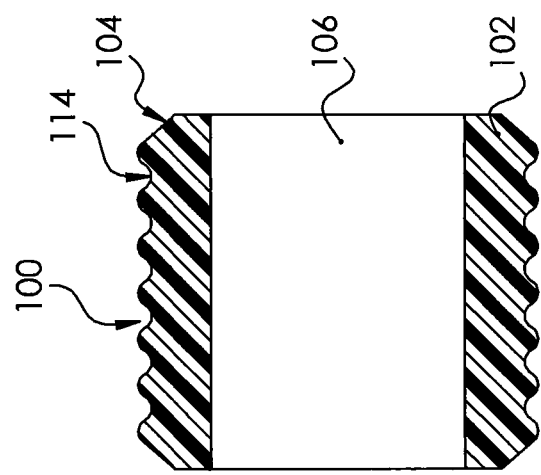
FIG. 3 shows a cross section view of a cylindrical sleeve portion having arcuate grooves around its outer circumference before attaching a cylindrical outer tube.

FIG. 1 shows a perspective view of a compressively resilient, dual layered bushing 100 according to the invention. The bushing 100 comprises a cylindrical sleeve 102 having an outer wall 104, and a hollow core 106 through said cylindrical sleeve defining an inner wall 108 of the cylindrical sleeve 102. The hollow core 106 extends longitudinally from a top 110 of the cylindrical sleeve 102 to a bottom 112 of the cylindrical sleeve 102. The cylindrical sleeve 102 comprises a first compressively resilient material. In a preferred embodiment, the first compressively resilient material has a durometer value of from about 80 to about 100 on the Rockwell M scale. Suitably, the first compressively resilient material comprises at least one of a polyester polymer, polyether ether ketone polymer, graphite, polytetrafluoroethylene, nylon, a polyamide-imide plastic, Teflon, a polyimide polymer and an aromatic polyamide polymer. Preferably the first compressively resilient material comprises an aromatic polyamide polymer. In one embodiment, the hollow core has a diameter of from about 0.5 inch to about 6 inches. Preferably, the hollow core has a diameter of from about 0.625 inch to about 2.5 inches. In one embodiment, thickness of the cylindrical sleeve from the inner wall to the outer wall is from about 0.125 inch to about 2 inches. Preferably, the thickness of the cylindrical sleeve from the inner wall to the outer wall is from about 0.125 inch to about 1 inch. As seen in FIGS. 2 and 3, a plurality of separated, parallel grooves 114 are positioned through the outer wall 104 and extend around a circumference of the cylindrical sleeve 102. In general, the cylindrical sleeve with parallel grooves 114 may be manufactured by starting with commonly available tube stock and then grooves 114 are machined around a circumference of the cylindrical sleeve with a lathe. The grooves 114 may have any convenient cross section profile such as arcuate, rectangular or triangular, however the grooves are parallel to each other and do not form a spiral.

FIG. 3 shows a cross section view of a cylindrical sleeve portion having arcuate grooves around its outer circumference prior to application of a cylindrical outer tube.

Figure 4:
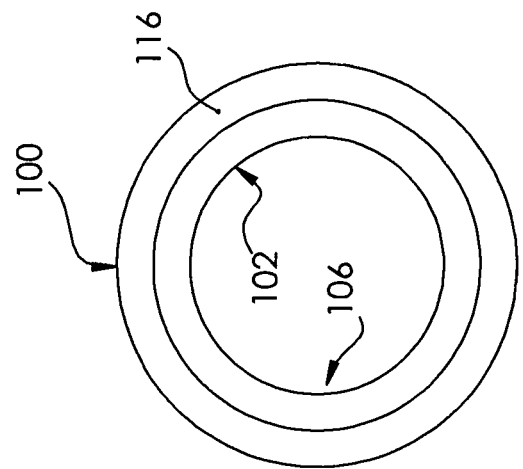
FIG. 4 shows an end cross section view thereof.

FIG. 2 shows a cross section view of bushing according to the invention showing a cylindrical sleeve 102 having arcuate grooves 114 around its outer circumference after application of a cylindrical outer tube 116. FIG. 4 shows an end cross section view thereof.

A cylindrical outer tube 116 is attached around the circumference of the outer wall of the cylindrical sleeve 102 extending from the top 110 of the cylindrical sleeve 102 to the bottom 112 of the cylindrical sleeve 102. The outer tube 116 has a smooth outer wall and an inner wall having a plurality of separated parallel projections 118 extending outwardly from the inner wall of the outer tube 116 and extending around a circumference of the inner wall of the outer tube 116. The projections 118 from the inner wall of the outer tube 116 are attached to and mate with the plurality of parallel grooves 114 through the outer wall around the circumference of the cylindrical sleeve 102. The cylindrical outer tube 116 and the projections 118 comprise a second compressively resilient material different from the first compressively resilient material. In one embodiment, the second compressively resilient material has a durometer value of from about 40 to about 80 on the Shore A scale. Preferably the second compressively resilient material has a durometer value of from about 60 to about 70 on the Shore A scale. In one embodiment the second compressively resilient material comprises at least one of silicone, a fluoropolymer elastomer, and hydrogenated nitrile butadiene rubber.

Figure 8:
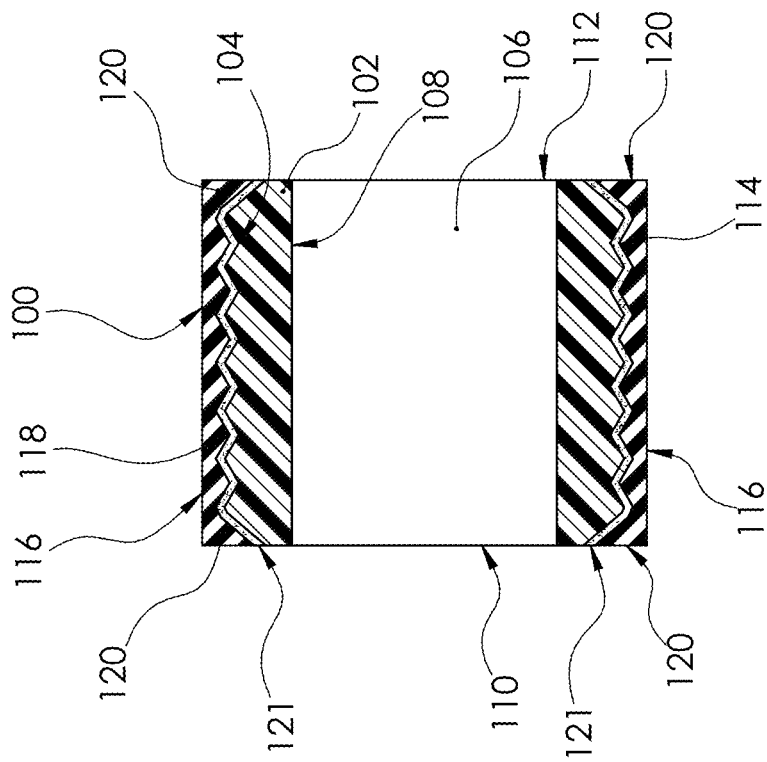
FIG. 8 shows a cross section view of dual layered bushing having a cylindrical sleeve with triangular grooves around its outer circumference and a cylindrical outer tube.
Figure 7:
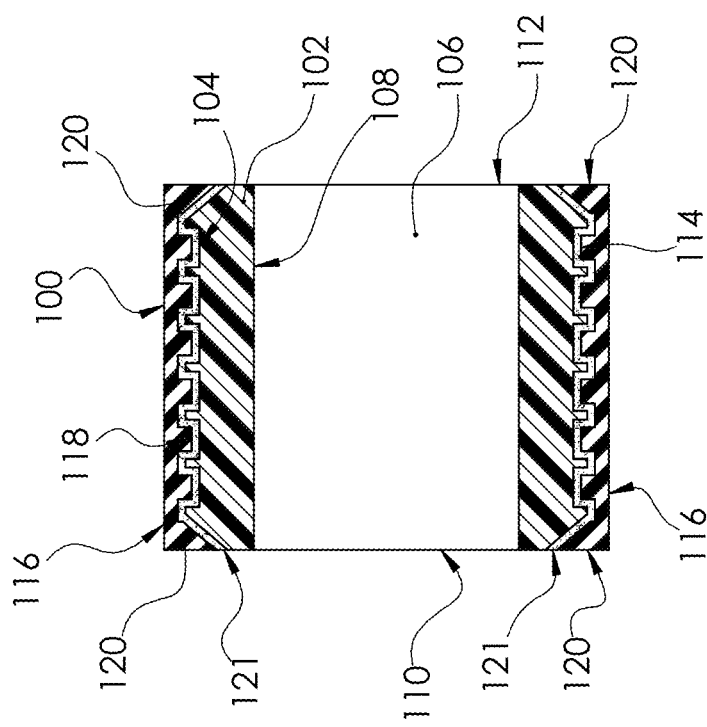
FIG. 7 shows a cross section view of dual layered bushing having a cylindrical sleeve with rectangular grooves around its outer circumference and a cylindrical outer tube.

Preferably the second compressively resilient material comprises a fluoropolymer elastomer. A most preferred fluoropolymer elastomer is Viton (a Dupont Trade name). The cylindrical outer tube 116 may be formed by injection molding the second compressively resilient material around the cylindrical sleeve 102 thus filling grooves 114 and forming mating projections 118 within the grooves 114 followed by oven curing. In a prior art configuration without such parallel grooves 114 and groove mating cylindrical outer tube 116, the cylindrical sleeve 102 and cylindrical outer tube 116 would tend to separate in use. In one embodiment, cylindrical sleeve 102 may be formed by grinding cylindrical tube stock to form grooves 114. In another embodiment of the invention, cylindrical sleeve 102 may be formed by wrapping a fabric such as a polyester polymer, polyether ether ketone polymer, graphite, polytetrafluoroethylene, nylon, a polyamide-imide plastic, Teflon, a polyimide polymer and an aromatic polyamide polymer around a mandrel. The mandrel is then removed and the fabric is then oven cured or vulcanized to a durometer value of from about 40 to about 80 on the Shore A scale. Cylindrical sleeve 102 may then be formed by grinding the cured fabric to form grooves 114. The cylindrical sleeve 102 having arcuate grooves is then injection molded with a fluoropolymer elastomer thus filling grooves 114 and forming mating projections 118 within the grooves 114 followed by oven curing. The cylindrical outer tube 116 may then be ground to form the desired outer diameter. Preferably the cylindrical outer tube 116 is attached around the circumference of the outer wall of the cylindrical sleeve 102 by an intermediate adhesive or bonding agent 121 as seen in FIG. 7 and FIG. 8. In a preferred embodiment, the cylindrical outer tube 116 terminates at a chamfered edge 120 at the top of the cylindrical tube and at the bottom of the cylindrical tube. The chamfered ends of cylindrical tube 116 plus the grooves and projections being parallel to one another rather than in a spiral configuration prevent the cylindrical tube 116 and cylindrical sleeve 102 from separating or sliding away from one another due to vibrations during shaft rotation. This arrangement affords flexibility and resilience to the overall busting when in use.

Figure 5:
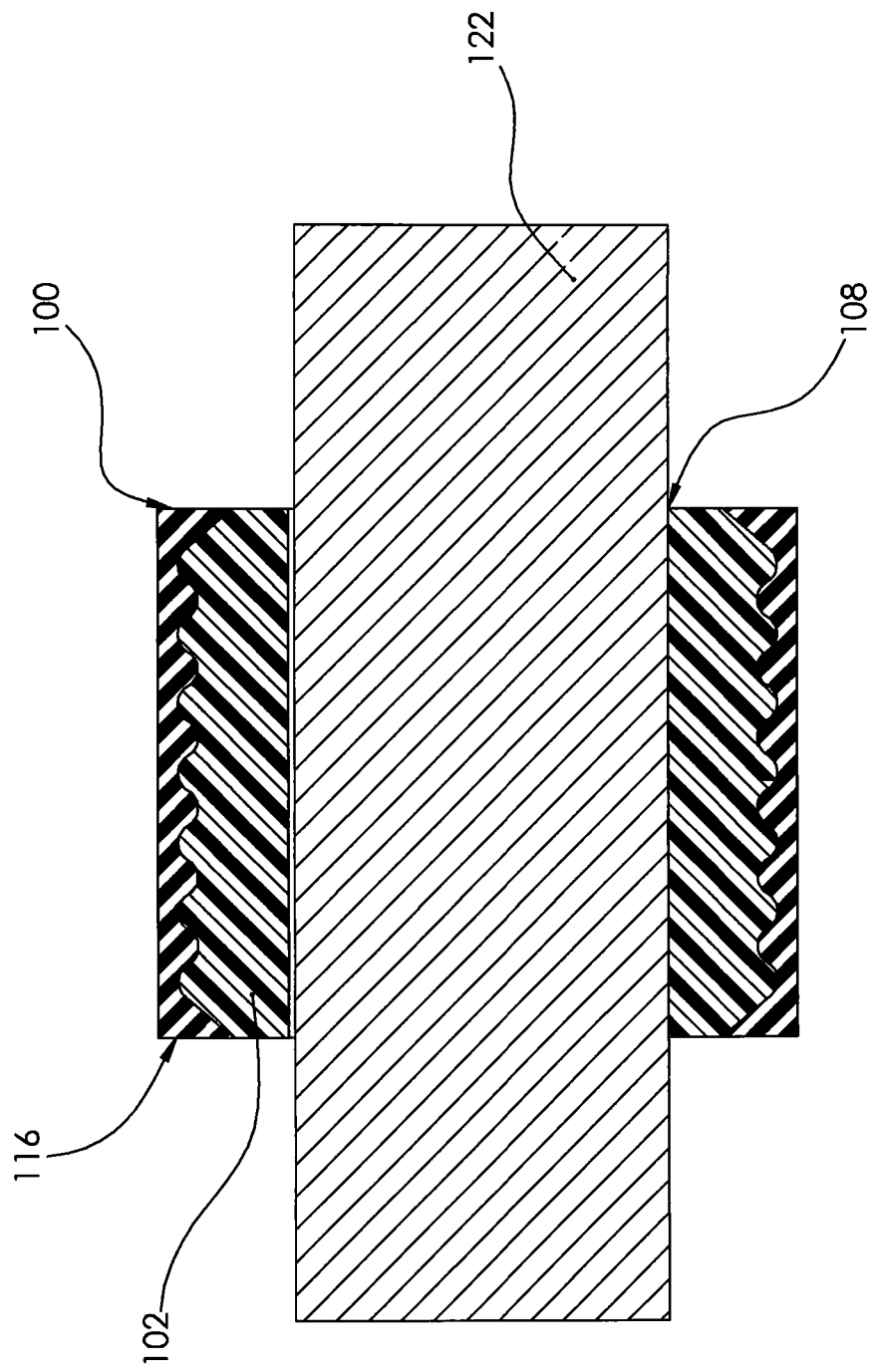
FIG. 5 shows a compressively resilient bushing retaining a central shaft.

FIG. 5 shows a compressively resilient bushing 100 further comprising a shaft 122 within said hollow core, said shaft meeting said cylindrical sleeve 102 at the inner wall 108. Said shaft could be rotating with respect to its own axis and in relation to the compressively resilient bushing, or it could be barely rotating a few degrees such as a pivoting mechanism.

Figure 6:
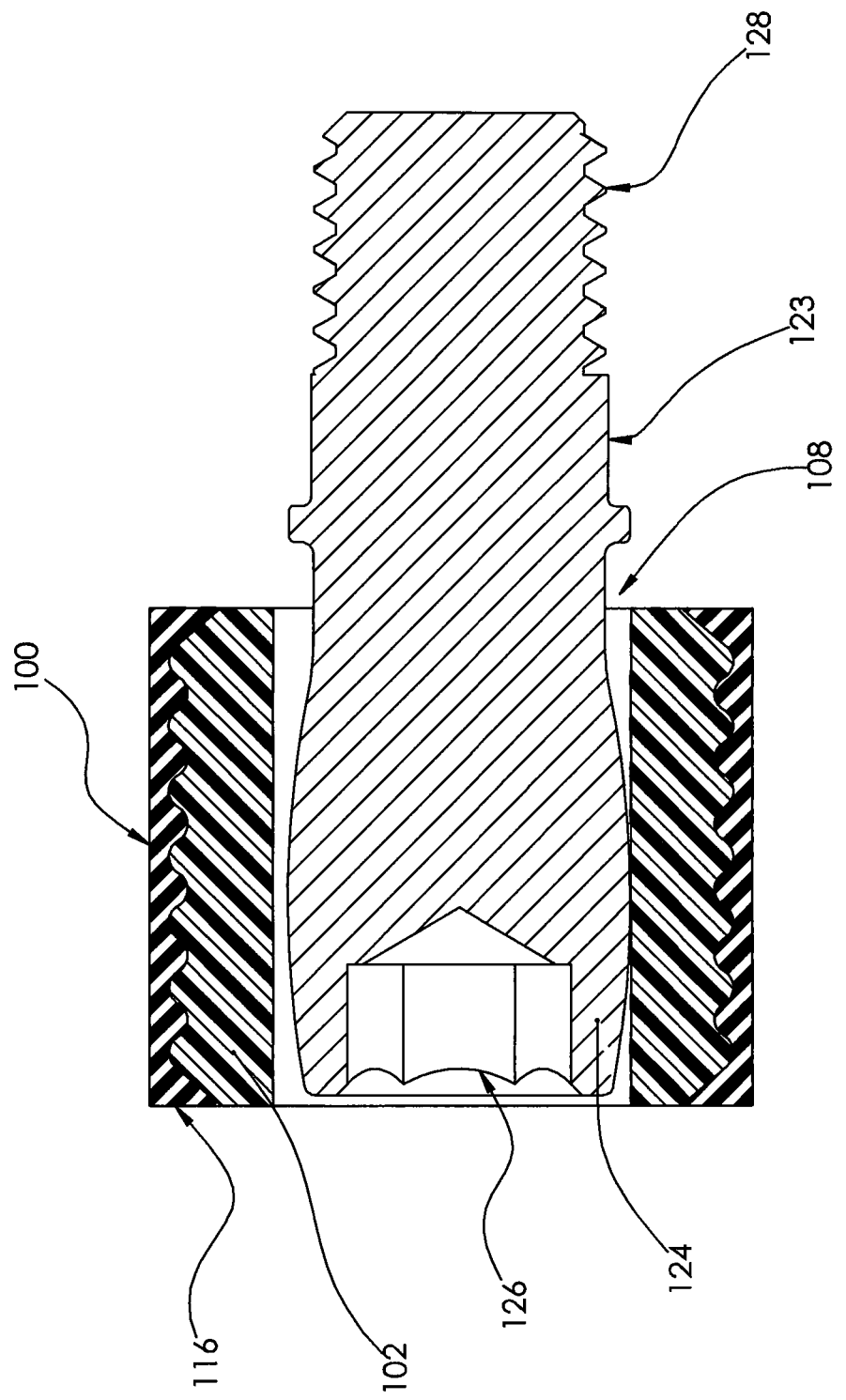
FIG. 6 shows a compressively resilient bushing retaining a bulbous pin.

FIG. 6 shows a compressively resilient bushing further comprising a pin 123 having a bulbous end 124 positioned within said hollow core, said bulbous end 124 of said pin 123 meeting said cylindrical sleeve 102 at the inner wall 108. Pin 123 may have a threaded end 128 and a screw end 126 to facilitate attachment of pin 123 to component parts of shaft coupling alignment devices such as those shown in U.S. Pat. Nos. 10,865,835 and 6,325,722. The compressively resilient bushing serves to steady the shaft 122 or pin 123 and lowers vibrations during operation of the coupling alignment devices.

FIG. 7 shows a cross section view of dual layered bushing having a cylindrical sleeve which is analogous to the embodiment of FIG. 2 except having rectangular grooves around its outer circumference and a cylindrical outer tube and showing enlarged adhesive layer 121.

FIG. 8 shows a cross section view of dual layered bushing having a cylindrical sleeve which is analogous to the embodiment of FIG. 2 except having triangular grooves around its outer circumference and a cylindrical outer tube and showing enlarged adhesive layer 121.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A bushing which comprises
   a cylindrical sleeve, said cylindrical sleeve having an outer wall, and
   a hollow core through said cylindrical sleeve defining an inner wall of the cylindrical sleeve; said hollow core extending longitudinally from a top of the cylindrical sleeve to a bottom of the cylindrical sleeve; said cylindrical sleeve comprising a first compressively resilient material wherein the first compressively resilient material has a durometer value of from about 80 to about 100 on the Rockwell M scale;
   a plurality of substantially equally separated, parallel grooves which do not form a spiral through the outer wall extending around a circumference of the cylindrical sleeve;
   a cylindrical outer tube attached around the circumference of the outer wall of the cylindrical sleeve extending from the top of the cylindrical sleeve to the bottom of the cylindrical sleeve, said outer tube having a smooth outer wall and an inner wall having a plurality of substantially equally separated parallel projections which do not form a spiral extending outwardly from the inner wall of the outer tube and extending around a circumference of the inner wall of the outer tube;
   the projections from the inner wall of the outer tube being attached to and mating with the plurality of grooves through the outer wall around the circumference of the cylindrical sleeve, wherein the cylindrical outer tube is attached around the circumference of the outer wall of the cylindrical sleeve by an adhesive or bonding agent;
   the cylindrical outer tube and the projections comprising a second compressively resilient material different from the first compressively resilient material wherein the second compressively resilient material has a durometer value of from about 40 to about 80 on the Shore A scale.

2. The bushing of claim 1 wherein the second compressively resilient material has a durometer value of from about 60 to about 70 on the Shore A scale.

3. The bushing of claim 1 wherein the second compressively resilient material comprises at least one of silicone, a fluoropolymer elastomer, and hydrogenated nitrile butadiene rubber.

4. The bushing of claim 1 wherein the second compressively resilient material comprises a fluoropolymer elastomer.

5. The bushing of claim 1 wherein the first compressively resilient material comprises at least one of a polyester polymer, polyether ether ketone polymer, graphite, polytetrafluoroethylene, nylon, a polyamide-imide plastic, Teflon, a polyimide polymer and an aromatic polyamide polymer.

6. The bushing of claim 1 wherein the first compressively resilient material comprises an aromatic polyamide polymer.

7. The bushing of claim 1 further comprising a shaft within said hollow core, said shaft meeting said cylindrical sleeve at the inner wall thereof.

8. The bushing of claim 1 further comprising a pin having a bulbous end positioned within said hollow core, said bulbous end of said pin meeting said cylindrical sleeve at the inner wall thereof.

9. The bushing of claim 1 wherein the hollow core has a diameter of from about 0.5 inch to about 6 inches.

10. The bushing of claim 1 wherein the hollow core has a diameter of from about 0.625 inch to about 2.5 inches.

11. The bushing of claim 1 wherein the thickness of the cylindrical sleeve from the inner wall to the outer wall is from about 0.125 inch to about 2 inches.

12. The bushing of claim 1 wherein the thickness of the cylindrical sleeve from the inner wall to the outer wall is from about 0.125 inch to about 1 inch.

13. The bushing of claim 1 wherein the cylindrical outer tube terminates at a chamfered edge at the top of the cylindrical sleeve and at the bottom of the cylindrical sleeve.

14. The bushing of claim 1 wherein the grooves and projections have mating arcuate cross sections.

15. The bushing of claim 1 wherein the grooves and projections have mating rectangular cross sections.

16. The bushing of claim 1 wherein the grooves and projections have mating triangular cross sections.

17. The bushing of claim 1 wherein
   the first compressively resilient material comprises an aromatic polyamide polymer having a durometer value of from about 80 to about 100 on the Rockwell M scale;
   the second compressively resilient material comprises a fluoropolymer elastomer having a durometer value of from about 60 to about 70 on the Shore A scale;
   the grooves and projections have mating arcuate cross sections;
   and
   wherein the cylindrical outer tube terminates at a chamfered edge at the top of the cylindrical tube and at the bottom of the cylindrical tube.

* * * * *